(12) United States Patent
Kennedy

(10) Patent No.: US 7,694,296 B1
(45) Date of Patent: Apr. 6, 2010

(54) PREVENTING UNAUTHORIZED INSTALLS AND UNINSTALLS OF SOFTWARE MODULES

(75) Inventor: Mark Kennedy, Redondo Beach, CA (US)

(73) Assignee: Symantec Corporation, Cupertino, CA (US)

( * ) Notice: Subject to any disclaimer, the term of this patent is extended or adjusted under 35 U.S.C. 154(b) by 1059 days.

(21) Appl. No.: 11/135,708

(22) Filed: May 24, 2005

(51) Int. Cl.
*G06F 9/44* (2006.01)
*G06F 9/445* (2006.01)

(52) U.S. Cl. .................................. 717/175; 717/169

(58) Field of Classification Search .......... 717/168–178
See application file for complete search history.

(56) References Cited

U.S. PATENT DOCUMENTS

| | | | |
|---|---|---|---|
| 6,226,747 B1 * | 5/2001 | Larsson et al. | 717/174 |
| 7,430,689 B1 * | 9/2008 | Adams | 714/39 |
| 2002/0010863 A1 * | 1/2002 | Mankefors | 713/189 |
| 2004/0025033 A1 * | 2/2004 | Todd | 713/189 |
| 2005/0216909 A1 * | 9/2005 | James et al. | 717/174 |
| 2006/0136889 A1 * | 6/2006 | Han et al. | 717/162 |

OTHER PUBLICATIONS

Jones et al., "Approached to Computer Lab Management: Lockdown vs. Freedom"; 2000, ACM, pp. 127-129.*
"Gold Parser, A Free Multi-Platform Parser Generator", [online] devincook.com [retrieved Oct. 7, 2003] Retrieved from the Internet: <URL: http://www.devincook.com/goldparser/index.htm>.
"RFC 2821—Simple Mail Transport Protocol", Klensin J., editor, Apr. 2001, [online] Faqs.org [retrieved Oct. 13, 2003] Retrieved from the Internet: <URL: http://www.faqs.org/rfcs/rfc2821.html>.
Pop-Up Stopper Professional [Online] Apr. 22, 2005, [Retrieved from the Internet on Apr. 22, 2005] Retrieved from the Internet: <URL: http://www.panicware.com/index.html>, Seattle, WA.
AdsCleaner v 4.3 for Windows NT/2000/XP, [Online] Apr. 22, 2005 [Retrieved from the Internet on Apr. 22, 2005] Retrieved from the Internet: <URL: http://www.adscleaner.com>.
AntiTracer: Unwanted Pop-ups and other Advertisements, [Online] Apr. 22, 2005, [Retrieved from the Internet on Apr. 22, 2005] Retrieved from the Internet: <URL: http://www.antitracer.com/popup_killer.html>, Dublin, IE.
Sabin, Todd, "Comparing binaries with graph isomorphisms", downloaded from http://www.bindview.com/Services/Razor/Papers/2004/comparing_binaries.cfm, Jan. 17, 2006, Cupertino, CA.
Flake, Halvar, "Automated Reverse Engineering" Black Hat Windows 2004, downloaded from http://www.blackhat.com/html/bh-media-archives/bh-archives-2004.html, Jan. 17, 2006, Seattle, WA.

* cited by examiner

*Primary Examiner*—Wei Y Zhen
*Assistant Examiner*—Ryan D Coyer
(74) *Attorney, Agent, or Firm*—Fenwick & West LLP

(57) ABSTRACT

Apparati, methods, and computer-readable media for preventing unauthorized installs and uninstalls of software modules on a computer. One method embodiment of the present invention comprises the steps of amending (41) an uninstall instructions file (32) to include an invention attribute (33) and at least one pre-selected uninstall condition (34); detecting (42) an attempt to open said uninstall instructions file (32); checking (43) the uninstall instructions file (32) for presence of said invention attribute (33); determining (45) whether the at least one condition (34) is satisfied; and aborting (46) the uninstall when at least one condition (34) is not satisfied.

12 Claims, 4 Drawing Sheets

PREVENTING UNAUTHORIZED INSTALLS AND UNINSTALLS OF SOFTWARE MODULES

TECHNICAL FIELD

This invention pertains to the field of preventing unauthorized installs and uninstalls of software modules.

BACKGROUND ART

Nefarious individuals often attempt to install unwanted software modules (e.g., Trojan horses) on a user's computer. These unwanted modules can wreak havoc on said computer. Similarly, nefarious individuals often attempt to uninstall useful software modules from a user's computer without the user's consent. An example of an unauthorized uninstall is the case of a hacker uninstalling a protection program such as SymProtect manufactured by Symantec Corporation of Cupertino, Calif. Once the protective umbrella of SymProtect is removed from the computer, it is easier for the hacker to cause damage to other files on the computer. What is needed is a suite of apparati, methods, and computer-readable media by which a user can prevent unauthorized installs and uninstalls of software modules on his or her computer. These needs are satisfied by the present invention.

DISCLOSURE OF INVENTION

Apparati, methods, and computer-readable media for preventing unauthorized installs and uninstalls of software modules on a computer. One method embodiment of the present invention comprises the steps of amending (41) an uninstall instructions file (32) to include an invention attribute (33) and at least one pre-selected uninstall condition (34); detecting (42) an attempt to open said uninstall instructions file (32); checking (43) the uninstall instructions file (32) for presence of said invention attribute (33); determining (45) whether the at least one condition (34) is satisfied; and aborting (46) the uninstall when at least one condition (34) is not satisfied.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
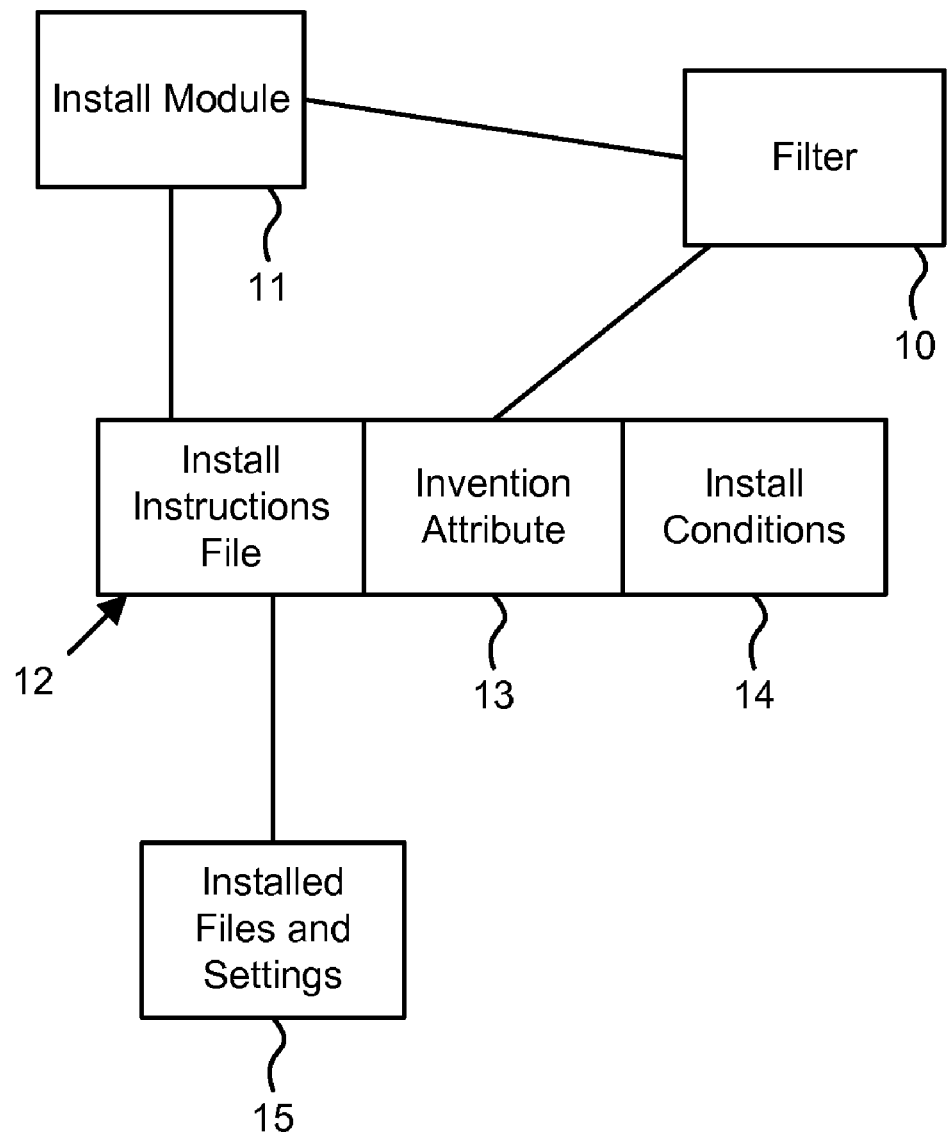
FIG. 1 is a block diagram illustrating a first embodiment of the present invention, in which the objective is to prevent unauthorized installs of software modules on the user's computer.

Turning to FIG. 1, install module 11 is an executable module that installs a set of files and settings 15 on the user's computer. In the case of a Windows operating system, install module 11 may be MSIExec. Coupled to install module 11 is install instructions file 12, which contains instructions and other information necessary to install files and settings 15. In the case of a Windows operating system, install instructions file 12 may be a .MSI file. In the present invention, install instructions file 12 has been augmented with an invention attribute field 13 and a pre-selected install conditions field 14. The purpose of invention attribute 13 is to enable filter 10, which is coupled to install module 11 and to install instructions file 12, to determine whether the present invention is implemented on the computer. Invention attribute 13 may be a flag, a non-flag attribute, or any other means by which filter 10 can determine whether the present invention has been implemented, such as the presence of at least one non-zero bit in conditions field 14.

Filter 10 may be a module that performs other roles in the computer, such as SymProtect manufactured by Symantec Corporation of Cupertino, Calif.

Figure 2:
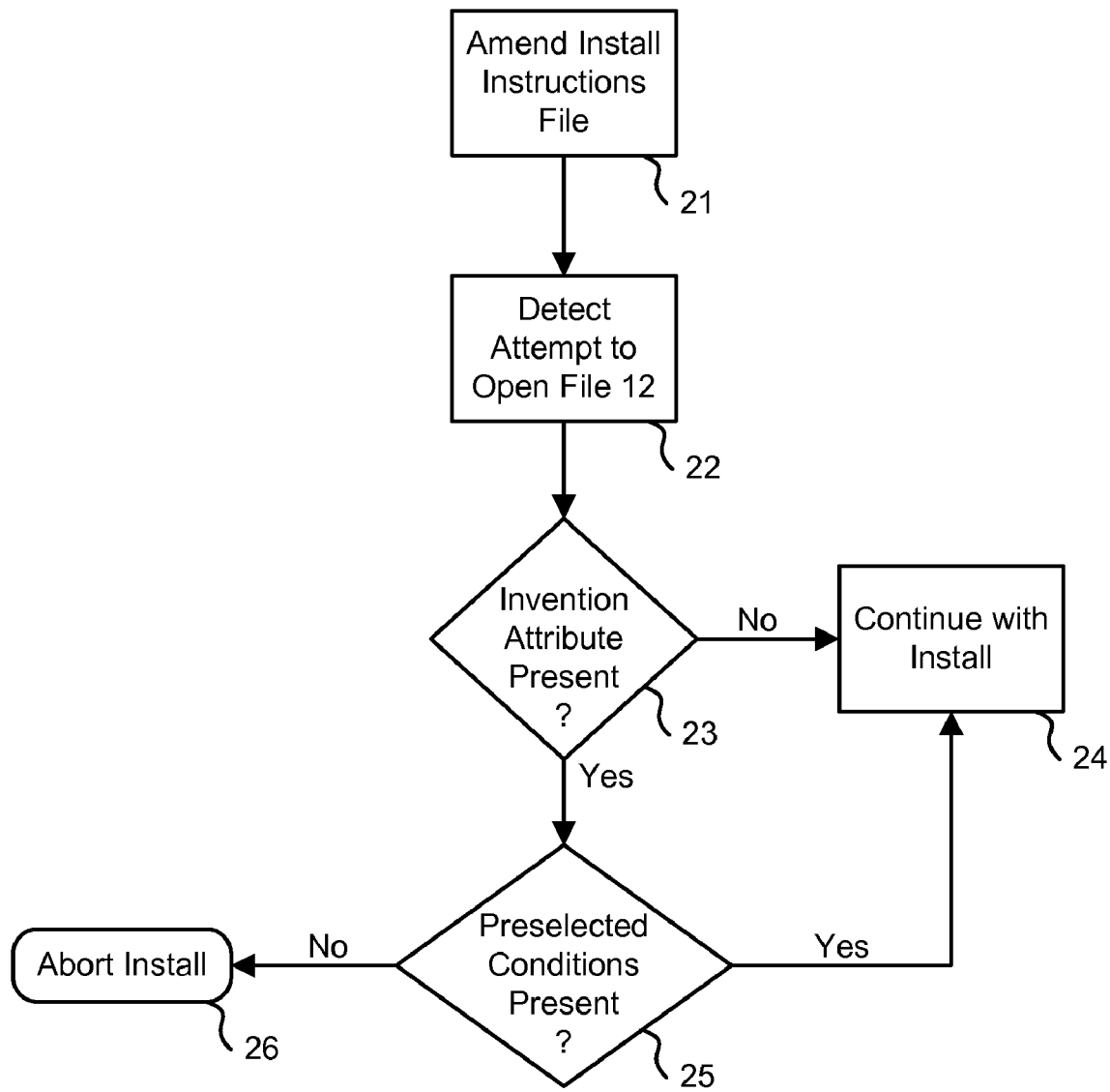
FIG. 2 is a flow diagram illustrating said first embodiment.

The content of conditions field 14 will be more fully described below in conjunction with the description of FIG. 2.

Filter 10 and fields 13 and 14 (and fields 33 and 34 of FIG. 3) can be embodied in any combination of software, firmware, and/or hardware. Modules 10, 13, 14, 33, and/or 34 can reside on one or more computer-readable media, such as one or more RAMs, ROMs, EPROMs, etc., in which case computer program instructions carry out the method steps of the present invention.

The operation of the first embodiment of the present invention will now be described in conjunction with FIG. 2.

At step 21, install instructions file 12 is augmented to include invention attribute 13 and pre-selected install conditions 14. This step can be performed before or during the installation process. Step 21 can be performed by filter 10 or by any other module associated with the computer. Said other module can be embodied in any combination of software, firmware, and/or hardware; and can reside on one or more computer-readable media, such as one or more RAMs, ROMs, EPROMs, etc., in which case computer program instructions carry out the method steps of the present invention.

Step 22 is performed during the installation process itself. At step 22, filter 10 detects an attempt by install module 11 to open install instructions file 12. At step 23, filter 10 checks to see whether invention attribute 13 is present. If not, the invention has not been implemented on the computer, and so the install continues in a normal fashion at step 24.

If, on the other hand, invention attribute 13 is present, filter 10 performs step 25, during which filter 10 checks to see whether all of the pre-selected install conditions 14 are present in file 12. If so, filter 10 determines that the install is safe to proceed, and so the install does proceed, at step 24. If, on the other hand, at least one of the pre-selected install conditions is not present, filter 10 aborts the install at step 26, by means of preventing module 11 from accessing file 12.

Thus, the pre-selected install conditions 14 govern whether the install is allowed to proceed. Conditions 14 comprise at least one condition from the group of conditions consisting of:

The condition that a pre-selected process must be currently executing on the computer. An example of such a process is a master installer, such as SymSetup manufactured by Symantec Corporation of Cupertino, Calif. This condition tends to insure that a whole package of modules is being installed, rather than just a piece of the package. The rationale for this test is that the installation of just a piece of the package gives rise to a suspicion of nefarious activity.

The condition that a pre-selected file must be present in the computer, e.g., a file with a certain name must exist at a certain location. An example of a file that must be present is SymSetup, which is normally present when SymProtect is present. SymSetup performs MSIExec's work for it during installs and uninstalls, and extends MSIExec by enabling multiple .MSIs to be worked on simultaneously.

The condition that a pre-selected registry state must be present in the computer, e.g., a pre-selected registry key must exist and must have a certain value.

The condition that a pre-selected process relationship must exist in the computer. An example of this condition is that SymSetup must have MSIExec as a child process of SymSetup. Another example is to require that MISExec be running in administration mode.

Figure 3:
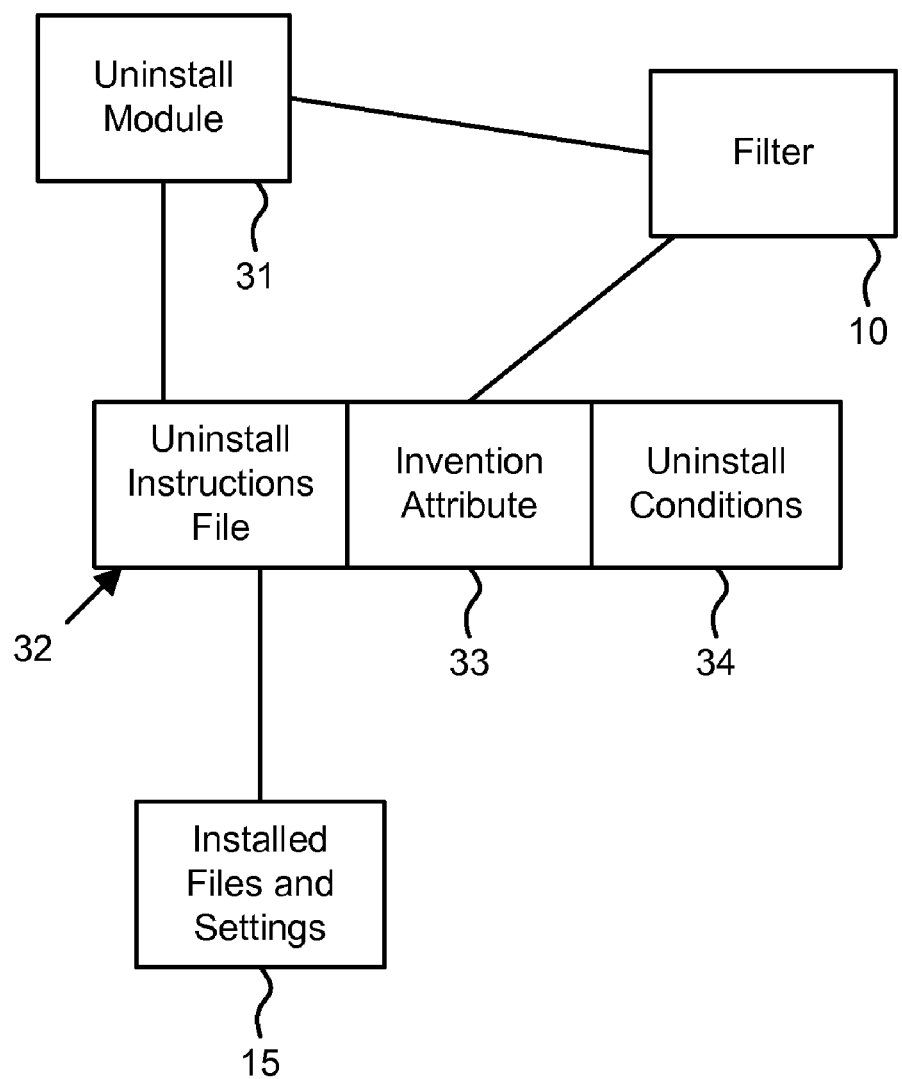
FIG. 3 is a block diagram illustrating a second embodiment of the present invention, in which the objective is to prevent unauthorized uninstalls of software modules on the user's computer.

FIG. 3 is similar to FIG. 1, except that executable uninstall module 31 is present instead of executable install module 11, and uninstall instructions file 32 is present instead of install instructions file 12. In certain cases, such as Microsoft Installer, which does both installs and uninstalls, uninstall module 31 is the same as install module 11. Similarly, filter 10 can be the same filter as in FIG. 1 or a different filter.

Uninstall instructions file 32 may be a subset of install instructions file 12, because during the installation process certain programs and data may be removed from install instructions file 12. Enough remains within uninstall instructions file 32 to instruct uninstall module 31 how to perform the uninstall. Such instructions may include a list of files 15 that were installed with instructions as to how to get them. File 32 may include registry keys and other settings. Invention attribute 33 performs the same role for uninstalls that invention attribute 13 performs for installs, and pre-selected uninstall conditions 34 perform the same role for uninstalls that pre-selection install conditions 14 perform for installs. Thus, invention attribute 33 may be a flag, a non-flag attribute, or any other means by which filter 10 can determine whether the present invention has been implemented, such as the presence of at least one non-zero bit in uninstall conditions field 34. The content of uninstall conditions field 34 will be more fully described below in conjunction with the description of FIG. 4.

Figure 4:
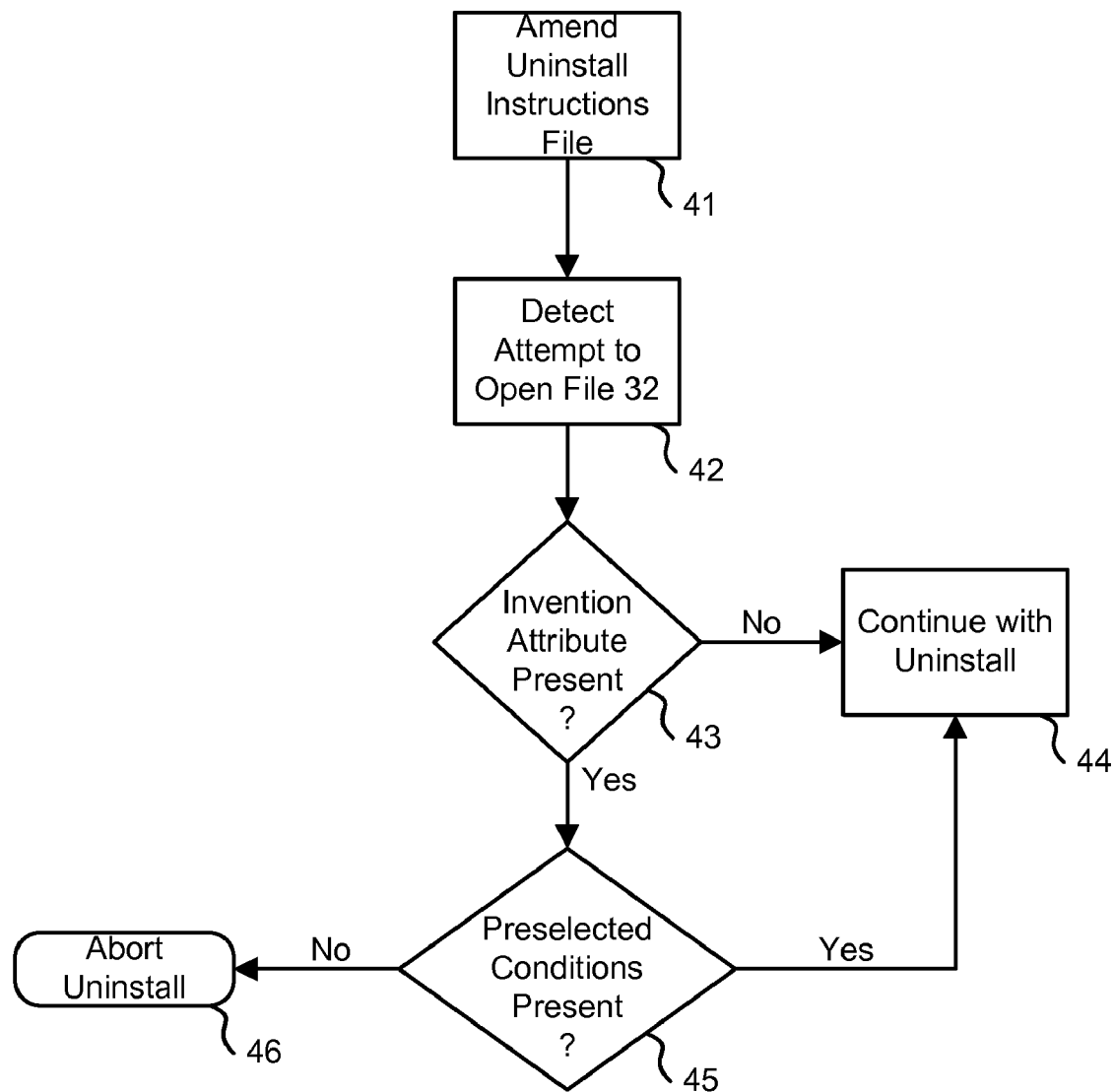
FIG. 4 is a flow diagram illustrating said second embodiment.

An uninstall method embodiment of the present invention will now be described in conjunction with FIG. 4.

At step 41, uninstall instructions file 32 is augmented to include invention attribute 33 and pre-selected uninstall conditions 34. This step can be performed before or during the uninstallation process. Step 41 can be performed by filter 10 or by any other module associated with the computer. Said other module can be embodied in any combination of software, firmware, and/or hardware; and can reside on one or more computer-readable media, such as one or more RAMs, ROMs, EPROMs, etc., in which case computer program instructions carry out the method steps of the present invention.

Step 42 is performed during the uninstallation process itself. At step 42, filter 10 detects an attempt by uninstall module 31 to open uninstall instructions file 32. At step 43, filter 10 checks to see whether invention attribute 33 is present. If not, the invention has not been implemented on the computer, and so the uninstall continues in a normal fashion at step 44.

If, on the other hand, invention attribute 33 is present, filter 10 performs step 45, during which filter 10 checks to see whether all of the pre-selected uninstall conditions 34 are present in file 32. If so, filter 10 determines that the uninstall is safe to proceed, and so the uninstall does proceed, at step 44. If, on the other hand, at least one of the pre-selected uninstall conditions is not present, filter 10 aborts the uninstall at step 46, by means of preventing module 31 from accessing file 32.

Thus the pre-selected uninstall conditions 34 govern whether the uninstall is allowed to proceed. Conditions 34 comprise at least one condition from the group of conditions consisting of:

The condition that a pre-selected process must be currently executing on the computer. An example of such a process is a master uninstaller, such as SymSetup manufactured by Symantec Corporation of Cupertino, Calif. This condition tends to insure that a whole package of modules is being uninstalled, rather than just a piece of the package. The rationale for this test is that the uninstallation of just a piece of the package gives rise to a suspicion of nefarious activity.

The condition that a pre-selected file must be present in the computer, e.g., a file with a certain name must exist at a certain location. An example of a file that must be present is SymSetup, which is normally present when SymProtect is present. SymSetup performs MSIExec's work for it during installs and uninstalls, and extends MSIExec by enabling multiple .MSIs to be worked on simultaneously.

The condition that a pre-selected registry state must be present in the computer, e.g., a pre-selected registry key must exist and must have a certain value.

The condition that a pre-selected process relationship must exist in the computer. An example of this condition is that SymSetup must have MSIExec as a child process of SymSetup. Another example is to require that MISExec be running in administration mode.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for preventing an unauthorized install of a software module on a computer, said method comprising the steps of:
   detecting an attempt to open an install instructions file that includes instructions for installing the software module on the computer;
   checking the install instructions file for presence of a filtering attribute, wherein the presence of the filtering attribute indicates that unauthorized install prevention is implemented on the computer;
   responsive to a positive determination that the filtering attribute is present, identifying at least one install condition specified by the install instructions file, the at least one install condition comprising whether a specified process relationship exists in the computer, wherein the at least one install condition identifies a master installer process and a second installer process invoked by the master installer process to execute the install of the software module according to the instructions in the install instructions file, and wherein the specified process relationship comprises the second installer process being a child process of the master installer process;
   determining whether the at least one install condition is satisfied; and
   aborting the install if the at least one install condition is not satisfied.

2. The method of claim 1 wherein the at least one install condition further comprises:

a specified registry state must be present in the computer.

3. At least one computer-readable storage medium containing executable computer program instructions for preventing an unauthorized install of a software module on a computer, said computer program instructions performing steps comprising:

detecting an attempt to open an install instructions file that includes instructions for installing the software module on the computer;

checking the install instructions file for presence of a filtering attribute, wherein the presence of the filtering attribute indicates that unauthorized install prevention is implemented on the computer;

responsive to a positive determination that the filtering attribute is present, identifying at least one install condition specified by the install instructions file, the at least one install condition comprising whether a specified process relationship exists in the computer, wherein the at least one install condition identifies a master installer process and a second installer process invoked by the master installer process to execute the install of the software module according to the instructions in the install instructions file, and wherein the specified process relationship comprises the second installer process being a child process of the master installer process;

determining whether the at least one install condition is satisfied; and aborting the install if the at least one install condition is not satisfied.

4. The at least one computer-readable medium of claim 3 wherein the at least one install condition further comprises:

a specified registry state must be present in the computer.

5. A computer-implemented method for preventing an unauthorized uninstall of a software module on a computer, said method comprising the steps of:

detecting an attempt to open an uninstall instructions file that includes instructions for uninstalling the software module on the computer;

checking the uninstall instructions file for presence of a filtering attribute, wherein the presence of the filtering attribute indicates that unauthorized uninstall prevention is implemented on the computer;

responsive to a positive determination that the filtering attribute is present, identifying at least one uninstall condition specified by the uninstall instructions file, the at least one uninstall condition comprising whether a specified process relationship exists in the computer, wherein the at least one uninstall condition identifies a master uninstaller process and a second uninstaller process invoked by the master uninstaller process to execute the uninstall of the software module according to the instructions in the uninstall instructions file, and wherein the specified process relationship comprises the second uninstaller process being a child process of the master uninstaller process;

determining whether the at least one uninstall condition is satisfied; and aborting the uninstall when the at least one uninstall condition is not satisfied.

6. The method of claim 5 wherein the at least one uninstall condition further comprises:

a specified registry state must be present in the computer.

7. At least one computer-readable storage medium containing executable computer program instructions for preventing an unauthorized uninstall of a software module on a computer, said computer program instructions performing steps comprising:

detecting an attempt to open an uninstall instructions file that includes instructions for uninstalling the software module on the computer;

checking the uninstall instructions file for presence of a filtering attribute, wherein the presence of the filtering attribute indicates that unauthorized uninstall prevention is implemented on the computer;

responsive to a positive determination that the filtering attribute is present, identifying at least one uninstall condition specified by the uninstall instructions file, the at least one uninstall condition comprising whether a specified process relationship exists in the computer, wherein the at least one uninstall condition identifies a master uninstaller process and a second uninstaller process invoked by the master uninstaller process to execute the uninstall of the software module according to the instructions in the uninstall instructions file, and wherein the specified process relationship comprises the second uninstaller process being a child process of the master uninstaller process;

determining whether the at least one uninstall condition is satisfied; and aborting the uninstall when the at least one uninstall condition is not satisfied.

8. The at least one computer-readable medium of claim 7 wherein the at least one uninstall condition further comprises:

a specified registry state must be present in the computer.

9. The method of claim 1, wherein the master installer process is associated with a protection program for protecting the computer and wherein the second installer process comprises an executable module for installing files on the computer.

10. The method of claim 3, wherein the master installer process is associated with a protection program for protecting the computer and wherein the second installer process comprises an executable module for installing files on the computer.

11. The method of claim 5, wherein the master uninstaller process is associated with a protection program for protecting the computer and wherein the second uninstaller process comprises an executable module for uninstalling files on the computer.

12. The method of claim 7, wherein the master uninstaller process is associated with a protection program for protecting the computer and wherein the second uninstaller process comprises an executable module for uninstalling files on the computer.

* * * * *